Figure 1:
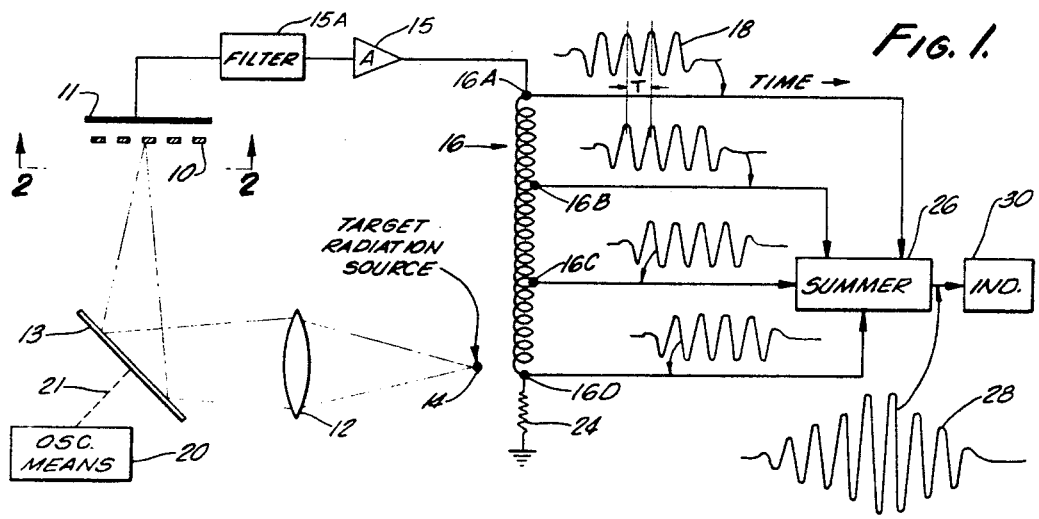

INVENTOR.
RICHARD W. POWELL
BY
Lyon Lyon
ATTORNEYS

United States Patent Office 3,324,296
Patented June 6, 1967

3,324,296
OPTICAL SEARCH NOISE DISCRIMINATION SYSTEM WITH RETICLE AND DELAY LINE
Richard W. Powell, Northridge, Calif., assignor to Whittaker Corporation, a corporation of California
Filed Feb. 27, 1963, Ser. No. 261,316
4 Claims. (Cl. 250—203)

The present invention relates to means and techniques useful in determining the presence of a signal when accompanied with background noise and to an improved optical and infrared search system embodying such means and techniques.

Briefly, as described herein, the invention is incorporated in an infrared and optical search system which uses the scanning reticle principle. In such systems a detector detects the radiation passing through such reticle and converts the same into an electrical signal which is amplified and displayed. Such signal, however, contains various components which may be referred to generally as useful information and noise. The present invention is concerned primarily with improved means and techniques whereby a discrimination occurs between that component representing useful information and that component representing noise such that the system has a greater capability to more clearly and accurately display or indicate that component representing useful information. This is accomplished generally by passing the detected signal containing both components through a multi-tapped delay line, with the delay between taps being commensurate with reticle bar spacing, and combining the signals appearing at each tap of the delay line. In one form of the invention, such signals at the delay line taps may be added and in another form of the invention, the signals appearing at the various taps may be multiplied in achieving an output signal which is more representative of useful information than of the noise components.

It is therefore a general object of the present invention to provide means and techniques and a system embodying such means and techniques as indicated above.

A specific object of the present invention is to provide means and techniques for improving the ability of an optical search system to discriminate against a background.

Another specific object of the present invention is to provide an improved optical or infrared search system.

Another specific object of the present invention is to provide means and techniques useful in a high field coverage, high speed scanning system.

Another specific object of the present invention is to provide an improved noise discrimination system using a multitap delay line in which the delay between taps is correlated with respect to the period of pulses applied to such line together with means for combining the signals at each of the taps, either by summing or multiplying the signals at such taps.

Another specific object of the present invention is to provide an improved scanning reticle search system with a delay line array that matches the reticle bars in spacing and number and also in scanning speed so as to convert the serial information normally obtained from the reticle out into parallel outputs from the delay line in such a way that superior discrimination is achieved.

Another specific object of the present invention is to provide an improved system of this character whereby the orientation of a particular target may be accurately established.

Figure 2:
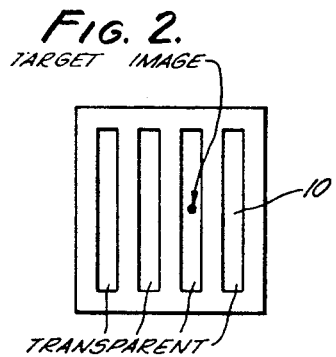
Figure 3:
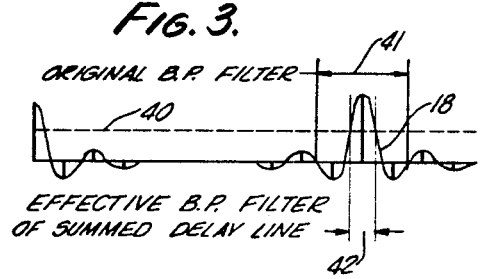
Figure 4:
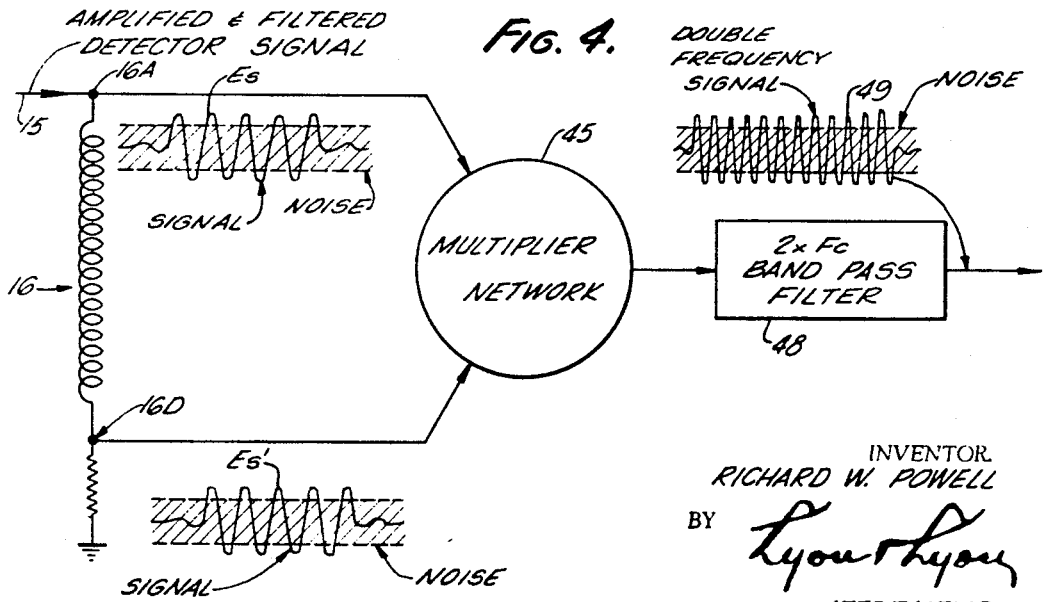

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates a system embodying features of the present invention;
FIGURE 2 is a view at the reticle as indicated by the lines 2—2 in FIGURE 1;
FIGURE 3 is a graph useful in explaining some of the results obtained in the system of FIGURE 1;
FIGURE 4 illustrates a modified form of the invention.

The system shown in FIGURE 1 is representative of an infrared and optical search system making use of the scanning reticle principle in order to have the ability of scanning a large field of view and still being able to discriminate against a large target in favor of a smaller one. Such search systems make use of very high speed detectors, such as indium antimonide, lead selenide, lead telluride, and germanium detectors, together with a mechanism for obtaining scanning speeds commensurate with the information capacity of the detector. Such a system is represented in FIGURE 1 and, as illustrated, includes a reticle 10 behind which is positioned radiation detection means 11 for receiving and detecting that radiation passing through the reticle 10 and developed from a scanning optical system that includes a radiation collector such as a lens system 12 and an oscillating mirror or prism 13. A target radiation source is indicated at 14 and radiation therefrom, after passing through the lens system 12, impinges on the mirror or prism 13, and oscillatory movement of the element 13 results in a scanning of the radiation beam across the reticle 10 such that during such scanning, the detection means 11, upon which such radiation is focused, periodically receives such radiation and develops an electrical signal which is filtered in filter 15A to eliminate low frequency components and then amplified in the amplifying means 15 before being applied to the delay line 16, such electrical signal so developed being in the general form indicated at 18 in FIGURE 1. This voltage represented at 18 is undulatory in nature because during scanning movement of the beam across the reticle 10, bars of the reticle prevent such radiation impinging on the detection means 11. For purposes of illustration, the voltage wave 18 has four peaks corresponding to the four windows in the exemplified reticle 10. A finite time is required for the beam to move from one window to the next adjacent window and this time is represented by the letter T which corresponds to the periodicity of the voltage wave 18. This time T is established by the speed at which the mirror or prism 13 is oscillated by the oscillation-producing means 20 which is mechanically coupled to the mirror or prism 13 as indicated by the dotted line 21. It will be assumed that such mirror-prism 13 is oscillated at a constant speed, in which case the time T is a constant. This time T may, for example, be ten microseconds.

The delay line 16 has a plurality of taps 16A, 16B, 16C, and 16D, with the tap 16A being connected to the output of the amplifier 15 and the tap 16D returned to ground through the characteristic impedance 24 for proper termination. The time delay to the signal imposed by the delay line between adjacent taps is equal to the time T and with the example given above, the delay between taps 16A and 16B is equal to ten microseconds. This results, as shown in FIGURE 1, in the voltage wave 18 being shifted a time interval T at successive taps 16A, 16B, 16C, and 16D. Each of the four voltages appearing at these four taps is applied to a summing network 26 wherein such voltage waves are added to produce an output voltage wave illustrated at 28, such voltage wave 28 being applied to the visual indicating or recording means 30 where it is indicated or observed.

Important advantages result from applying the amplified wave to the delay line and combining the same as will be more fully appreciated from the following description.

Radiation from a particular source, as exemplified by the source 14, in practice, is accompanied by other background radiation which is required to be discriminated against for clear, accurate and sensitive determinations of the target 14. Such background radiation manifests itself as what is termed spatial noise in the system. Such noise in the present system is not only that due to background radiation but also that due to random voltage noise developed in electrical components of the system such as, for example, in the detecting means 11 and amplifier 15 as temporal noise, all of which has an effect of rendering the target signal unintelligible or incapable of precise determination. The term "noise" as thus used herein has not only reference to signals produced by background radiation but also to sporadic electrical signals that manifest themselves as noise in the electrical components. It has been suggested that filters be used to separate signals from noise in such a sysetm but although they are effective in the case of spatial noise, such filters are generally much broader in band pass than desirable, thereby greatly reducing the detection range of the equipment since in such case more temporal noise is processed than is necessary or is desirable.

In a typical system, the electrical signal from a target obtained from a typical optical or infrared system generally consists of a number of equal pulses of equal duration and spacing, generally from three to twenty pulses per scan of the target are received. Using such technique, the search system scanner optimizes the detectivity of the detector as well as providing an optimum scanning rate. The detector generally has an information frequency rate that provides the best signal-to-noise ratio, whereas the scanner rate is dependent upon other considerations such as, for example, field of view required, resolution required, mechanical limitations and the like. Since the location of the target in the radiation field is not known, the timing of the initiation pulse train is similarly indeterminate, thus making the process of any type of heterodyning difficult, and hence broad band filters, when used, are required. Using the present system in which the number of taps on the delay line 16 is equal to the bit period of the reticle as it scans, the sum of the outputs of the various taps of the delay line produces an output signal indicated at 28. An input signal of N pulses of $E_s$ volts each results in a generally triangular wave of $2N-1$ pulses, such that the first and last pulses are equal substantially to $E_s$ volts and the center pulse is equal to substantially N times $E_s$ volts diminishing on either side of the center position linearly to the terminal pulse value, thus producing a greater signal and automatically locating the center of the pulse train (delayed by one half of its total period). Further, since the noise which is simultaneously transmitted through the delay line is uncorrelated, there is no dependable tendency for positive noise signals to add; hence, the noise is summed by its power so that the noise voltage decreases in accordance with the square root of N, giving a net gain in signal-to-noise ratio of the square foot of N over any simple filter system.

In effect, the delay line so provided is a noise filter, i.e. a narrow band pass filter having a narrower band pass than filters heretofore proposed, and this comparison is made in FIGURE 3 wherein the graph is plotted with amplitude as ordinates and the abscissae represent the frequency of the various Fourier components of the composite wave 18. In FIGURE 3 the horizontal line 40 indicates the noise level, the horizontal distance represented by the line 41 indicates the band pass of conventional filters, and the horizontal dimension 42 indicates the effective band pass provided by the delay line.

In the modification shown in FIGURE 4, the system is as illustrated in FIGURE 1 but in this instance instead of adding signals derived from a delay line, in FIGURE 4 signals are multiplied.

Thus, in FIGURE 4 the output of the amplifier 15 is applied to the delay line 16 and the two signals appearing respectively at the taps 16A and 16D of the delay line are applied to the multiplying network 45. The signals $E_s$ and $E_s'$, as shown, include also the noise components and the second delayed signal $E_s'$ is delayed in time an amount equal to an integral multiple of time T. The result of this multiplication is a double frequency signal which is applied to the signal processing circuit 48 which may include a band pass filter that passes substantially only such double frequency. In such case the output of the filter 48 is represented at 49 and it will be observed that the result of this multiplication or modulation results in an increase in signal-to-noise ratio of approximately fifty percent. The signal at the output of the filter 48 may be subjected to a second delay line tapped as described in connection with FIGURE 4, with the output of such second delay line again being multiplied to further improve the signal-to-noise ratio.

While the particular embodiments of the present invention have been shown and described, it will be obvious to those skilled in the art that changes and modifications may be made without departing from this invention in its broader aspects and, therefore the aim in the appended claims is to cover all such changes and modifications as fall within the true spirit and scope of this invention.

I claim:
1. An optical scanning system, a reticle, radiation detection means responsive to radiation for producing an electrical signal, radiation receiving and scanning means for directing received radiation and periodically directing the same through different windows of said reticle onto said detection means to develop a periodic electrical signal having a period T, delay means for producing a time delay T, means coupling said detection means to said delay means to produce from said signal a delayed signal delayed by time T, means combining said signal with said delayed signal to produce a third signal, and indicating means coupled to said combining means and indicating said third signal, said delay means comprising a delay line having a plurality of taps thereon corresponding in number to the number of windows in said reticle with the delay of the signal passing through said delay line at successive taps being equal to time T.

2. A system as set forth in claim 1 in which said combining means combines said signal with said delayed signal by addition.

3. A system as set forth in claim 1 in which said combining means combines said signal with said delayed signal by multiplication.

4. A system as set forth in claim 3 in which said multiplication results in double frequency components in said third signal, a band pass filter which passes only said double frequency components, the input of said band pass filter being coupled to said combining means, and the output of said band pass filter being coupled to said indicating means.

References Cited

UNITED STATES PATENTS

| | | | |
|---|---|---|---|
| 2,928,993 | 3/1960 | Liebson | 250—213 X |
| 2,970,276 | 1/1961 | Dollinger | 330—149 X |
| 2,982,853 | 5/1961 | Price et al. | 325—65 X |
| 2,995,662 | 8/1961 | Hamilton | 250—220 X |
| 3,038,996 | 6/1962 | Grube | 250—83.3 |
| 3,099,748 | 7/1963 | Weiss | 250—203 |
| 3,144,554 | 8/1964 | Whitney | 250—83.3 |

RALPH G. NILSON, *Primary Examiner.*

WALTER STOLWEIN, *Examiner.*

M. A. LEAVITT, *Assistant Examiner.*